(12) United States Patent
Kwon

(10) Patent No.: US 7,711,243 B2
(45) Date of Patent: May 4, 2010

(54) METHOD AND APPARATUS FOR CONSECUTIVELY RECORDING BROADCAST PROGRAMS

(75) Inventor: Young Sang Kwon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1146 days.

(21) Appl. No.: 11/326,580

(22) Filed: Jan. 6, 2006

(65) Prior Publication Data

US 2006/0188220 A1    Aug. 24, 2006

(30) Foreign Application Priority Data

Jan. 6, 2005    (KR) ..................... 10-2005-0001348

(51) Int. Cl.
*H04N 5/76* (2006.01)
*H04N 7/00* (2006.01)
(52) U.S. Cl. .......................................... 386/83; 386/46
(58) Field of Classification Search .................. 386/1, 386/45–46, 125–126, 83
See application file for complete search history.

(56) References Cited

U.S. PATENT DOCUMENTS

| | | | |
|---|---|---|---|
| 6,625,386 B1 | 9/2003 | Kim et al. | |
| 7,474,831 B2 * | 1/2009 | Nishida | 386/46 |
| 2004/0024850 A1 | 2/2004 | Miyake | |
| 2004/0086263 A1 | 5/2004 | Arora | |

FOREIGN PATENT DOCUMENTS

| | | |
|---|---|---|
| CN | 1791204 | 6/2006 |
| CN | 1879410 | 12/2006 |
| EP | 1 482 729 | 12/2004 |
| EP | 1 761 054 | 3/2007 |
| WO | WO 2005/117432 | 8/2005 |

OTHER PUBLICATIONS

Chinese Office Action dated Nov. 7, 2008.
European Search Report issued in EP Appln. No. 06000225.0 dated Jan. 27, 2010.

* cited by examiner

*Primary Examiner*—Thai Tran
*Assistant Examiner*—Nigar Chowdhury
(74) *Attorney, Agent, or Firm*—KED & Associates, LLP

(57) ABSTRACT

Embodiments of methods and apparatus for recording at least two broadcast programs that are consecutive in time can consecutively record the plurality of programs (e.g., consecutively) on a recording medium without a process of creating and recording navigation information between programs. Navigation information for the recorded section can be created and recorded on the recording medium after the consecutive recording of the plurality of programs is completed. Such navigation information can consider the consecutive broadcast programs as a single entity or a plurality of individual entities (e.g., for play back).

15 Claims, 5 Drawing Sheets

METHOD AND APPARATUS FOR CONSECUTIVELY RECORDING BROADCAST PROGRAMS

BACKGROUND OF THE INVENTION

1. Field of the Invention

The present invention relates to a method and apparatus for consecutively recording broadcast programs that are scheduled to be recorded.

2. Background of the Related Art

As the number of available TV channels in terrestrial, satellite, and cable broadcasts increases, viewers frequently use the scheduled recording capability of their recording apparatus. Scheduled recording allows a program to be recorded between start and stop times on defined days so that the viewer can subsequently watch the recorded program when convenient.

If more than one program is scheduled to be recorded, a scheduled recording session may be followed immediately by another scheduled recording session as shown in FIG. 1a or a scheduled recording time may overlap with another scheduled recording time as shown in FIG. 1b. In case of FIG. 1b, the front part of Program #2 that overlaps with Program #1 in time cannot be recorded because the recording of Program #2 begins after the recording of Program #1 is completed.

Disk recorders that digitally record video/audio on a recordable disk are widely used as a replacement for video cassette recorders. When recording data on a disk, the disk recorder stores navigation information thereon for accessing the data later. The navigation information is recorded separate from the recorded data as one or more files at the leading area of the disk.

When performing scheduled recording as shown in FIG. 1a or FIG. 1b, the disk recorder creates information for accessing the recorded program, Program #1, upon completion of the scheduled recording of Program #1. The created information is added to the navigation information that has been loaded in an internal memory of the disk recorder and the updated navigation information is recorded on the disk before the next scheduled recording begins. The information for accessing the recorded program includes cell information that contains the recorded position of the whole program or each recorded section expressed based on the presentation time (PTM), program information (PGI) for treating the recorded section as a single program with reference to the cell information, time map information for allowing time-based searching of recorded sections, and other information.

After finishing the recording of the updated navigation information, the optical pickup of the disk recorder should return to the previous position where the previous scheduled recording session ended to begin the next scheduled recording session. The process of updating and recording the navigation information and returning to the program recording area takes a considerable amount of time. The time varies depending on the disk recorder but is typically about two minutes.

As described above, the related art apparatus for recording video signals have various disadvantages. For example, in the case of FIG. 1a, the two-minute amount of the front part of Program #2 cannot be recorded. In FIG. 1b, the overlapped part and the following additional two-minute amount of Program #2 cannot be recorded. The missed part, which is not expected by the user, might be regarded as being caused by a system defect by the user and may result in a warranty request. Further, it can result as an inconvenience to a user.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present inventions is to provide a method and apparatus for recording consecutive broadcast programs that substantially obviates one or more disadvantages or problems of the related art.

Another object of the present invention to provide a method and apparatus for recording consecutive broadcast programs that are scheduled to be recorded so that no additional part other than an overlapped part of two consecutive programs will be missed in the recording operation.

Another object of the present invention to provide a method and apparatus for recording consecutive broadcast programs where when it is determined that a plurality of programs that are scheduled to be recorded should be recorded consecutively, the plurality of programs are recorded consecutively on a recording medium without creating and recording navigation information between programs and navigation information for the recorded section can be created and recorded on the recording medium after the consecutive recording of the plurality of programs is completed.

Another object of the present invention is to provide a method and apparatus for recording consecutive broadcast programs that is capable of determining when a next scheduled recording should be performed consecutively before the current recording session ends.

Another object of the present invention is to provide a method and apparatus for recording consecutive broadcast programs that is capable of generating navigation information after recording of the last consecutive program is complete.

Another object of the present invention is to provide a method and apparatus for recording consecutive broadcast programs that is capable of generating navigation information after recording of the last consecutive program is complete and a plurality of recorded programs can be considered individual recorded objects or one recorded object.

According to an aspect of the invention for achieving at least the above objects in whole or in part, there is provided a method for recording broadcast programs that includes determining when programs scheduled to be recorded are a consecutive plurality of programs, recording the consecutive plurality of programs on a recording medium, creating navigation information for the recorded consecutive plurality of programs, and recording the navigation information for the recorded consecutive plurality of programs on the recording medium.

According to another aspect of the invention for achieving at least the above objects in whole or in part, there is provided a method for recording broadcast programs that includes determining when a first program and a second program that are scheduled to be recorded will be recorded consecutively, starting recording of the second program without recording navigation information for the first program when recording of the first program on a recording medium is completed and the determination is that the first program and the second program will be recorded consecutively, and creating navigation information for the first program and the second program and recording the navigation information on the recording medium.

According to another aspect of the invention for achieving at least the above objects in whole or in part, there is provided an apparatus for recording video signals that includes a receiver configured to tune to a channel of broadcast signals and detect a video signal from the channel, a recorder configured to record the detected video signal on a recording medium, a storage unit configured to store a plurality of scheduled recordings set by a user, and a controller coupled to the receiver, the recorder and the storage unit and configured to perform a next scheduled recording without recording navigation information for a first scheduled recording when the next scheduled recording stored in the storage unit is scheduled less than a predetermined reference time after the first scheduled recording is completed, and wherein the navigation information for the first scheduled recording is recorded when the next scheduled recording is completed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
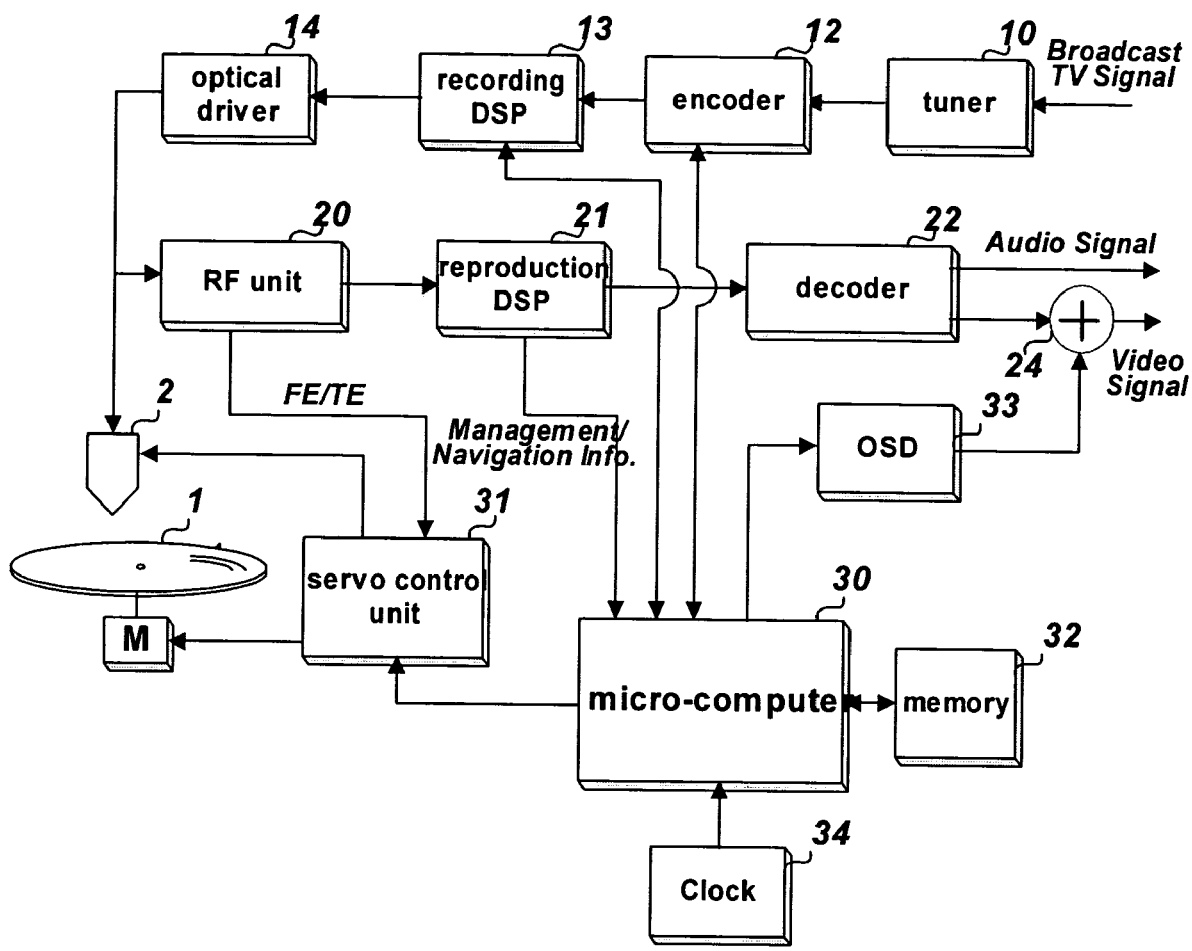
FIG. 2 is a diagram that illustrates an optical disk recording/reproducing apparatus according to embodiments of the invention.

FIG. 2 is a block diagram of an optical disk recording/reproducing apparatus according to embodiments of the invention. As shown in FIG. 2 the apparatus can include a tuner 10, an encoder 12, a recording DSP 13, an optical driver 14, an optical pickup 2, an RF unit 20, a reproduction DSP 21, a decoder 22, an OSD unit 33, a mixer 24, a servo control unit 31, a memory 32, a clock unit 34, and a microcomputer 30.

The tuner 10 can tune a requested TV channel. The encoder 12 can digitize the audio/video signals from the tuned channel, encode the digitized signals in the MPEG format, convert the MPEG encoded data into PES (packetized elementary stream) packets, and multiplex the audio and video PES packets. The recording DSP 13 can organize the sequence of PES packets into the ECC block format and modulate the data for recording. The optical driver 14 can provide electrical current to the optical pickup 2 according to the signal from the recording DSP 13. The optical pickup 2 can read signals recorded on an optical recording medium 1 such as a DVD+/-RW disk and record signals from the optical driver 14 on the recording medium 1.

The RF unit 20 can generate binary signals and focusing and tracking error signals from the signal from the optical pickup 2. The reproduction DSP 21 can retrieve digital data from the binary signals and extract management information and navigation information from the retrieved digital data. The decoder 22 can demultiplex data from the reproduction DSP 21 into audio and video PES packets and decode each of the PES packets to generate audio and video signals. The OSD unit 33 can generate character and graphic signals to be overlaid on the main video image. The mixer 24 can mix the video signal from the decoder 22 with the character and graphic signals from the OSD unit 33.

The servo control unit 31 can control the optical pickup 2 using the focusing and tracking error signals, control the laser beams, and control a spindle motor for rotating the optical recording medium 1. The memory 32 can store a list of scheduled recordings and navigation information. The clock unit 34 can keep track of the current date and time. The microcomputer 30 can process user input and supervise operations of the apparatus.

Figures 3, 4:
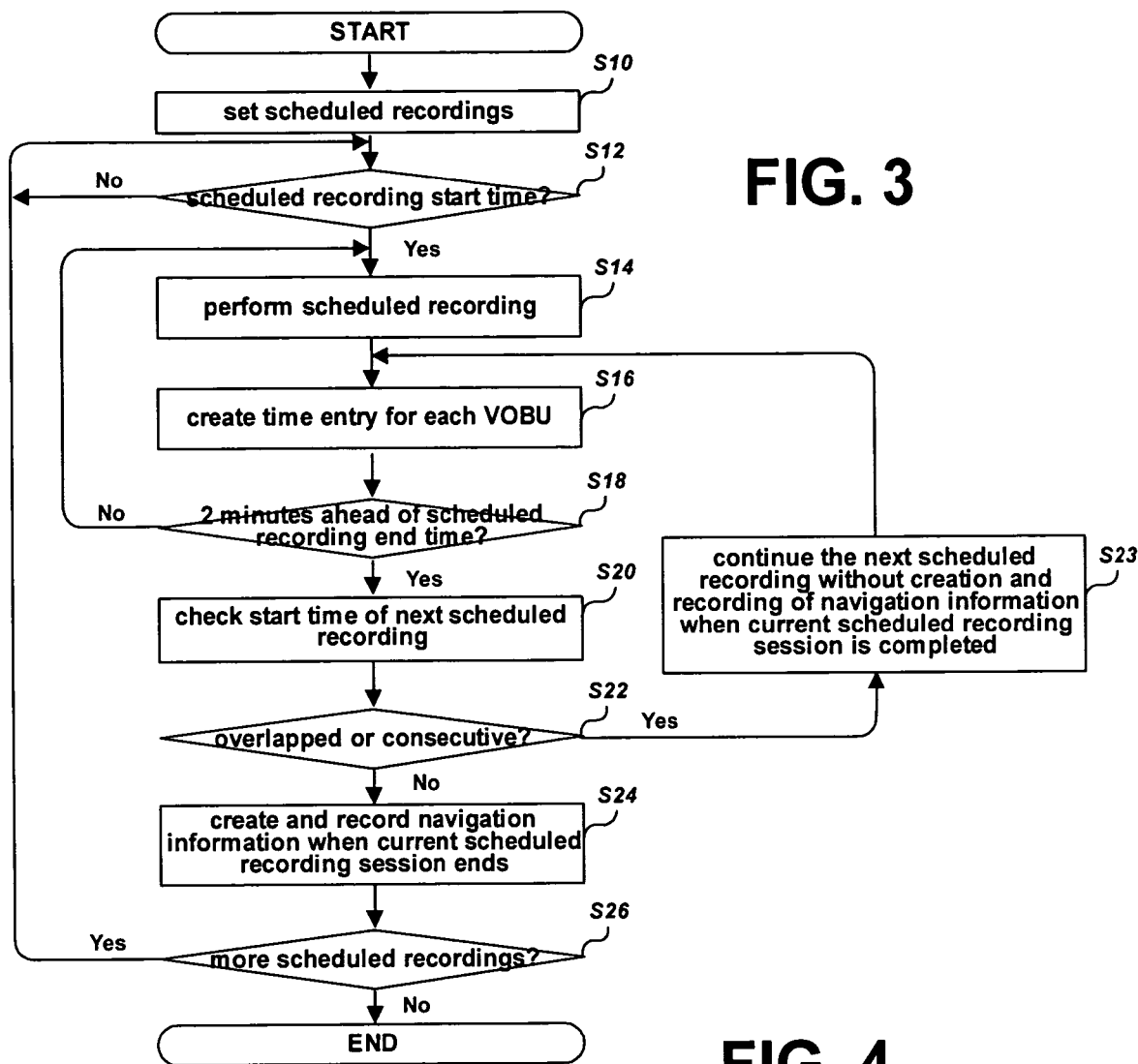
FIG. 3 is a flowchart that illustrates a method for recording consecutive broadcast programs in accordance with one embodiment of the invention.
FIG. 4 is a diagram that illustrates an exemplary menu screen for editing scheduled recordings.

The flowchart shown in FIG. 3 shows a method for recording consecutive broadcast programs in accordance with one embodiment of the invention. The embodiment shown in FIG. 3, can be applied to and will be described using the block diagram shown in FIG. 2. However, the invention is not intended to be so limited.

As shown in FIG. 3, if a user selects the scheduled recording menu using input means such as a remote controller, the microcomputer 30 can control the OSD unit 33 to output a scheduled recording menu screen. FIG. 4. shows an exemplary scheduled recording menu screen.

The signal from an input device such as the remote controller, which is typically an infrared signal, is received by infrared receiving means (not illustrated) and can be processed by the microcomputer 30. The user enters information required for a scheduled recording such as, the channel, time (e.g., start and end time including date), recording mode (e.g., one-time, daily, weekly, etc) using the keys on the remote controller.

Figure 1A:
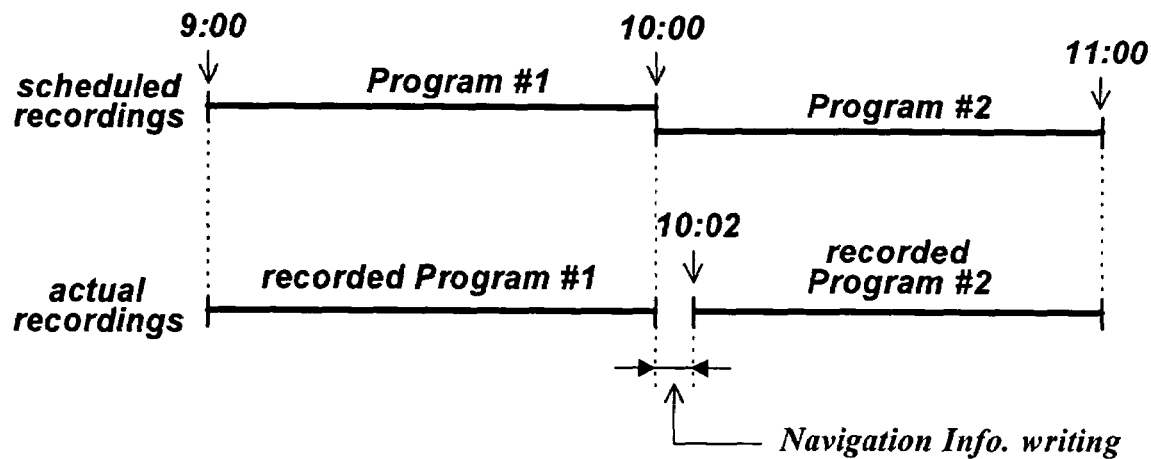
FIGS. 1a and 1b are diagrams that illustrate the related art scheduled recording schemes in which two programs that are consecutive in time are scheduled to be recorded.
Figure 1B:
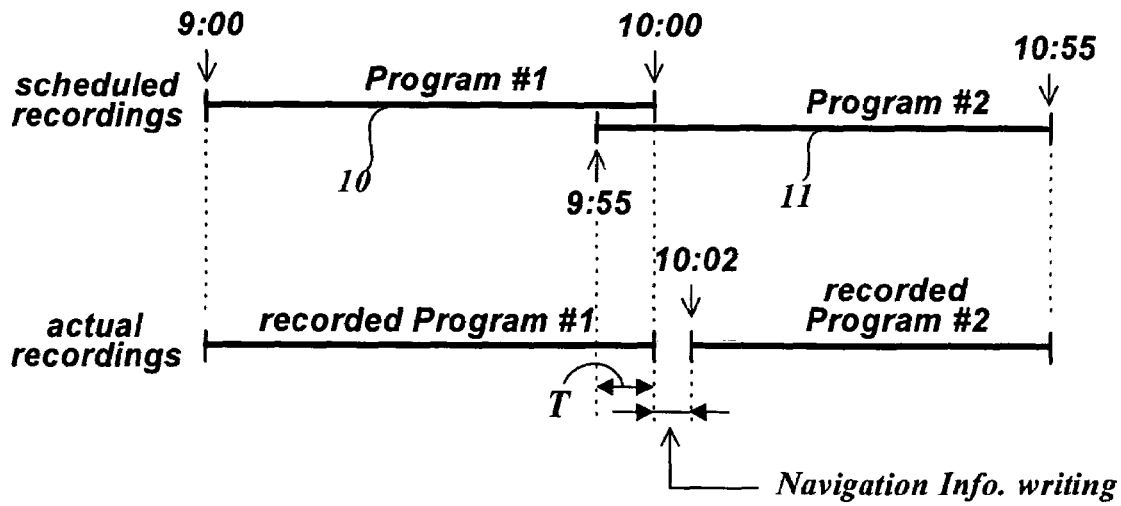

If the user completes the setting for the scheduled recording by selecting "done", the microcomputer 30 can register the newly entered scheduled recording in the scheduled recording list (e.g., stored in the memory 32) (block S10). Other items can be added to the scheduled recording list in the same manner. For the following description it is assumed that there are two scheduled recordings that are consecutive in time or overlap in part with each other (e.g., as shown in FIG. 1a or FIG. 1b).

After completing the settings for scheduled recording, the user can turn off the optical disk recording/reproducing apparatus to put the apparatus in standby mode. In the standby mode, every component except for the components needed for receiving power on/off requests is preferably inactive and thus power consumption thereby can be reduced significantly.

In the standby mode, the microcomputer 30 can keep examining when the current date and time (e.g., that the clock unit 34 monitors) falls within the time period of one of the scheduled recordings (block S12). If so, the microcomputer 30 can put the apparatus in normal mode and instruct the tuner 10 to tune to the channel to be recorded.

The microcomputer 30 can control the servo control unit 31 so that the optical disk 1 rotates at an appropriate rotational speed and the optical pickup 2 moves to a location where the scheduled recording session begins. The video signal received from the tuned channel can be MPEG encoded by the encoder 12 and then organized into PES packets. The PES packets can be constructed into the ECC block format for error correction by the recording DSP 13 and recorded on the recording medium 1 by the optical driver 14 and optical pickup 2 after being modulated into signals for recording. Thus, the apparatus can begin to record Program #1 as scheduled (block S14).

During the recording session, the microcomputer 30 can organize the recorded data into VOBUs, each of which is the basic navigation unit, and create a time entry for each of the VOBUs (block S16). A time entry can contain the size and presentation time duration of the corresponding VOBU. One VOBU can include one or more GOP (Group of Pictures), whose time duration ranges from 0.4 to 1 second, encoded by the encoder 12.

The microcomputer 30 can check the start time of the next scheduled recording at an appropriate point before the current scheduled recording session is completed (e.g., 1 or 2 minutes ahead) (blocks S18, S20). If the next recording session is scheduled to begin right after the completion of the current recording session (block S22), the microcomputer 30 can continue the recording operation without recording navigation information for the recorded program when the current scheduled recording is completed (block S23). If the channel to be recorded is different from the channel that has been recorded, the microcomputer 30 can control the tuner 10 to tune to the channel of the next scheduled recording and continue the recording operation.

According to one embodiment, if there is a time interval (Tgap) between the end of the current scheduled recording session and the start of the next scheduled recording session, the microcomputer 30 can compare Tgap with Tw, which is the time required for the creation and recording of navigation information and returning to the data recording area. Tw can typically be about two minutes. If Tgap is less than a half of Tw, e.g., Tgap<Tw/2, the microcomputer 30 preferably does not record navigation information when the first scheduled recording session is completed and begins the next scheduled recording session when the start time thereof is reached. During Tgap, the apparatus can execute a pause operation during which the position of the laser beam remains unchanged.

When the time that the clock unit 34 keeps track of indicates that the current scheduled recording session will be finished in one or two minutes (block S18), the microcomputer 30 can determine if there is another scheduled recording that is consecutive in time (blocks S20, S22). When the determination is that there is no additional consecutive scheduled recording, the microcomputer 30 can finish the recording operation including the creation of time entry information when the end time of the second (e.g., or more) scheduled recording is reached and create navigation information for the two recorded programs (block S24).

The navigation information can include cell information about the recorded section, program information that references the cell information, and program chain (PGC) information for treating the recorded section as a single title (e.g., single recorded unit) and the like. The navigation information including the time entry information that had been created during the scheduled recording session can be recorded in the navigation file located in the navigation information recording area (block S24). Since previous navigation information has been loaded in the memory 32, the created navigation information can be added to the previous navigation information and the updated navigation information can be written in the navigation file stored on the recording medium 1 through the recording DSP 13.

The microcomputer 30 can determine if there are more scheduled recordings left (block S26). If so, control can return to (block S12). However, if there is no scheduled recording left, the apparatus can enter the standby mode.

Figure 5A:
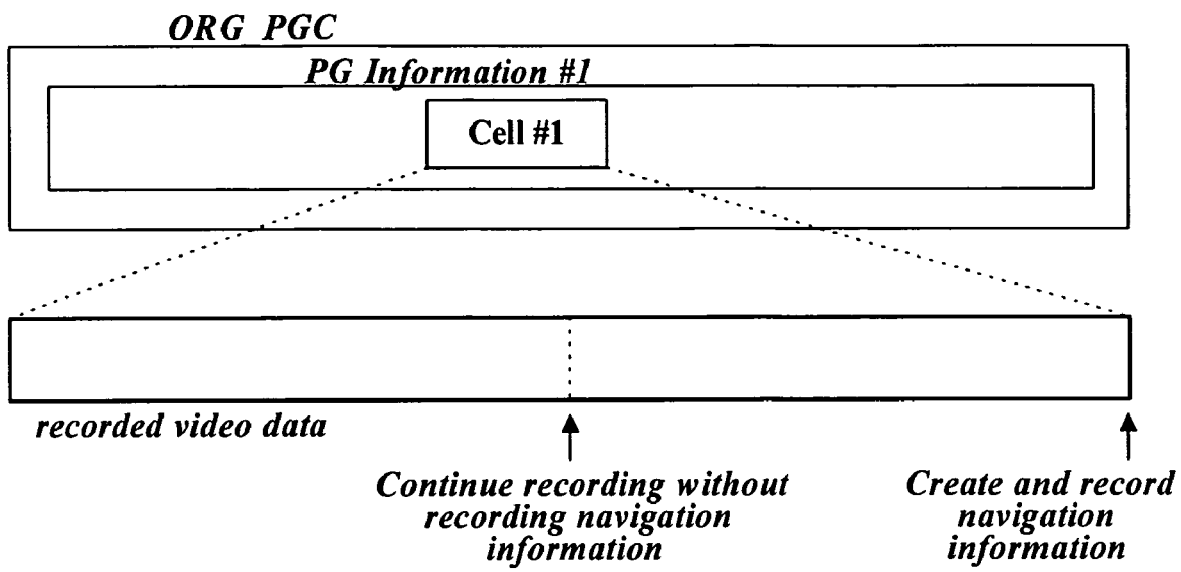
FIGS. 5a and 5b is a diagram that illustrates how consecutive programs that are scheduled to be recorded are actually recorded and the structure of the navigation information in accordance with one embodiment of the invention, respectively.

The navigation information for the two consecutively recorded programs can manage the two programs with a single program chain as shown in FIG. 5a. In this case, therefore, the user can recognize the two recorded programs as a single title (e.g., recorded).

The embodiment of a recording method in accordance with the invention as shown in FIG. 3 can reduce or prevent an amount (e.g., two-minutes) of the front part of the subsequent consecutive recorded program (e.g., Program #2) from being missed. In the case where N programs that are consecutive in time are recorded, navigation information for the whole recorded section can be created after the N programs are all recorded consecutively to allow the scheduled recording to be seamless between programs. As a consequence, the N programs recorded consecutively can be treated as a single recorded title or recorded object.

Figure 5B:
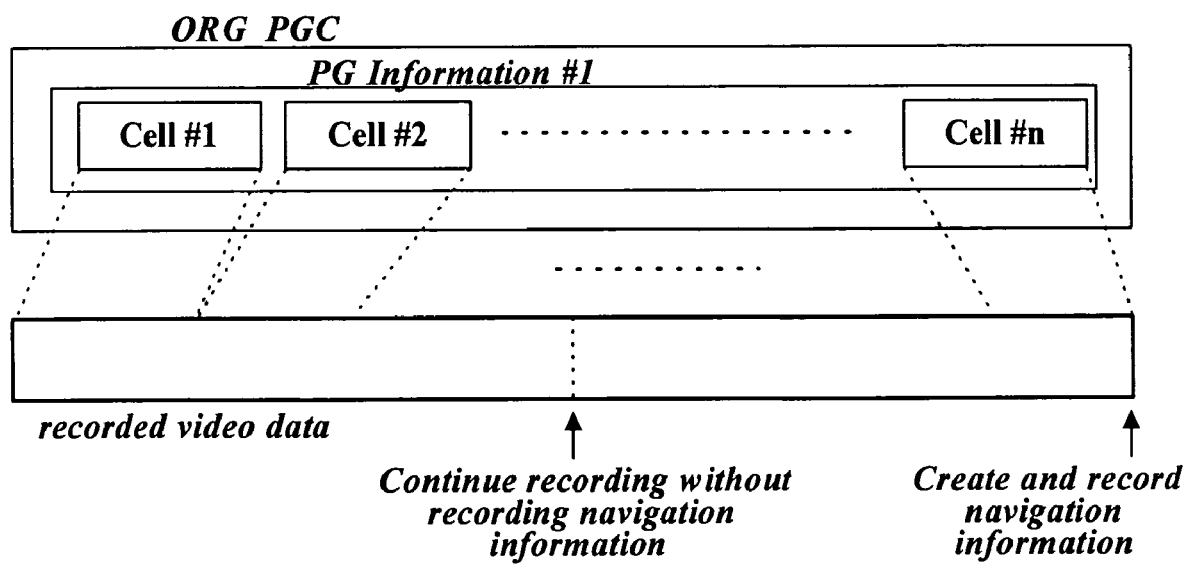

Alternatively, during the recording session, the microcomputer 30 may organize the recorded program into individual chapters on a time basis. In this case, the microcomputer 30 can create cell information for the recorded section corresponding to each chapter and temporarily store the cell information. After the recording session is completed, the microcomputer 30 can record the created cell information on the recording medium 1. As shown in FIG. 5b, the recorded section in this case can be referenced by a plurality of pieces of cell information.

Thus, it is also possible to create and record the navigation information in such a way that the programs can be managed individually after the consecutive recording of the programs. According to one exemplary method, the microcomputer 30 can temporarily store the presentation time (PTM) of the VOBU when the recording of the first program is finished and continue the scheduled recording of the second program. When the recording of the second program (e.g., last consecutive program) is completed, the microcomputer 30 can create navigation information as described above. In this case, however, the microcomputer 30 can organize cell information into two pieces based on the temporarily stored presentation time and create program information (PGI) for each piece of the cell information. If the recorded section referenced by cell information includes the temporarily stored presentation time, the cell information preferably divided into two pieces by the stored presentation time. The divided cell information can be recorded in the program chain information (e.g., ORG_PGGI). As a result, the recorded programs can be handled individually.

Figure 6A:
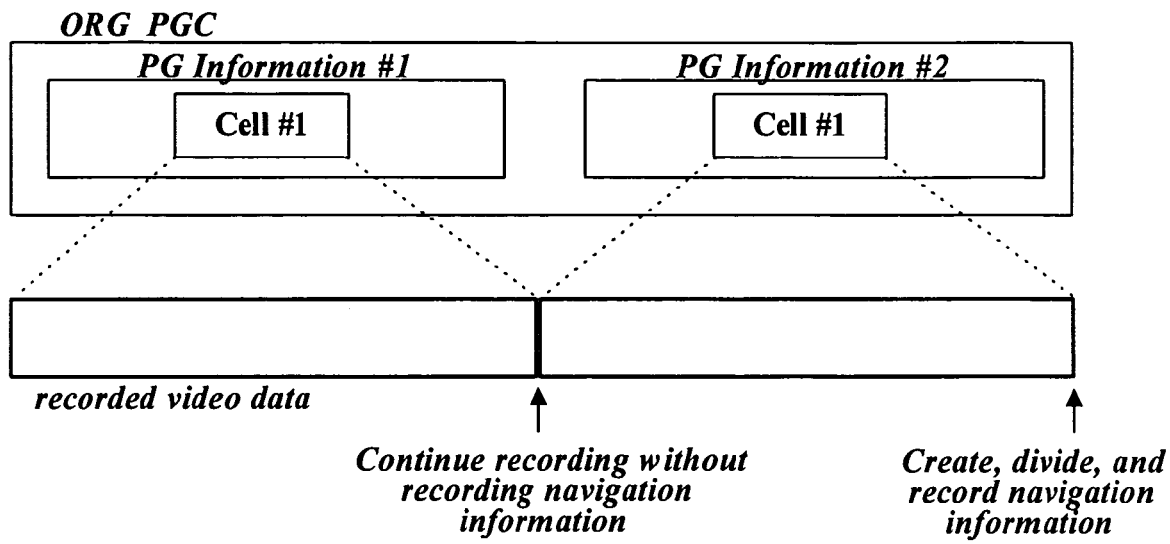
FIGS. 6a and 6b is a diagram that illustrates how consecutive programs that are scheduled to be recorded are actually recorded and the structure of the navigation information in accordance with another embodiment of the invention, respectively.
Figure 6B:
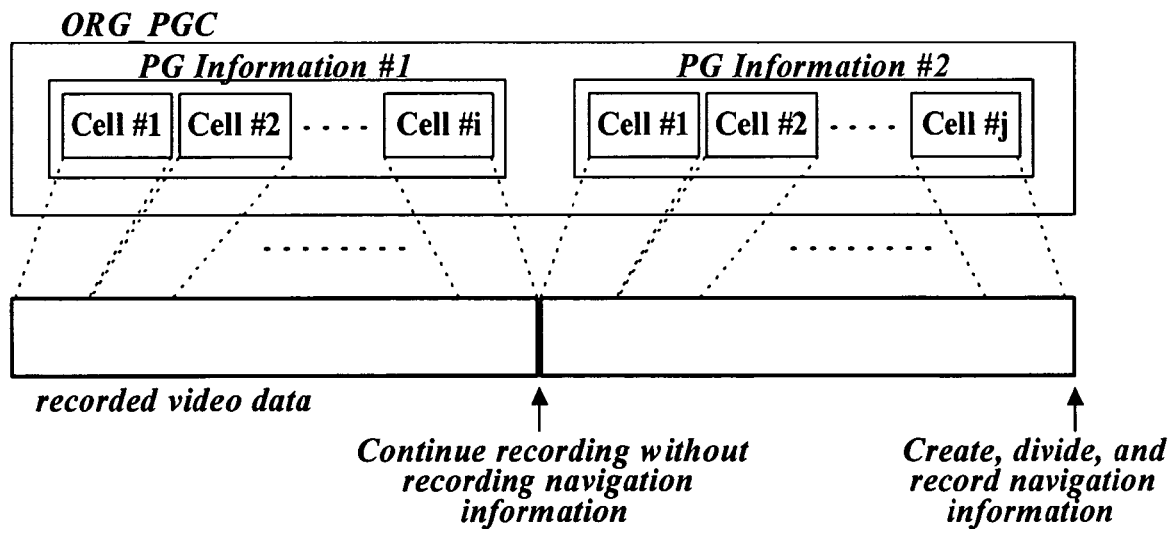

FIGS. 6a and 6b illustrate two exemplary embodiments. In FIG. 6a, the recorded programs can be handled individually but are not organized into chapters. As shown in FIG. 6b, the recorded programs are organized into chapters.

In the case where three or more programs that are consecutive in time are recorded according to embodiments of the invention, scheduled recording can be performed in the manner described above. When the recording of each program is completed, the presentation (PTM) time of the VOBU can be temporarily stored and cell information can later be divided by the presentation time. Program information can then be created for each piece of the cell information and recorded in the program chain information. Therefore, the three or more programs can be recorded without missed parts and still be recognized by the user as individually recorded objects.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of methods and apparatus for recording broadcast programs have various advantages. For example, embodiments of methods and apparatus for recording broadcast programs can reduce or prevent a part of a program scheduled to be recorded from being missed in the actual recording when two or more scheduled recordings are consecutive in time or overlap in part with each other.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for recording broadcast programs, comprising:
    determining whether there is a time interval between a plurality of programs scheduled to be recorded;
    executing a pause operation after recording of a current program of the plurality of programs is completed and before recording of a next program of the plurality of programs is initiated when it is determined that there is a time interval between the current program and the next program and the determined time interval is less than a predetermined reference time;
    generating navigation information for the recorded current and next programs;
    recording the navigation information for the recorded current and next programs on the recording; and
    wherein the predetermined reference time is based on an amount of time required for generating navigation information, recording the navigation information on the recording medium, and returning a recorder to a program recording area.

2. The method of claim 1, wherein determining whether there is a time interval further comprises determining whether the second program scheduled to be recorded should be recorded without recording navigation information for the current program currently being recorded before the current recording of the current program is completed.

3. The method of claim 1, wherein generating the navigation information and recording the navigation information comprises generating and recording navigation information for managing the recorded plurality of programs as a single recorded object or as a plurality of recorded objects equal in number to a number of programs scheduled to be recorded.

4. The method of claim 1, wherein the navigation information includes cell information that contains a recorded position of a whole program or each recorded section expressed based on the presentation time (PTM), program information (PGI) for treating the recorded section as a single program with reference to the cell information, or time map information for allowing time-based searching of recorded sections.

5. A method for recording broadcast programs, comprising:
    determining when a first program and a second program that are scheduled to be recorded will be recorded consecutively;
    starting recording of the second program without recording navigation information for the first program when recording of the first program on a recording medium is completed and the determination is that the first program and the second program will be recorded consecutively; and
    creating navigation information for the first program and the second program and recording the navigation information on the recording medium.

6. The method of claim 5, wherein the creating the navigation data for the first and second programs is performed when the recording of the second program is completed.

7. The method of claim 5, wherein the navigation information for the first program and the second program creates and records navigation information for managing the first program and the second program as separately recorded objects or as a single recorded object.

8. The method of claim 7, wherein a program time stamp is temporarily stored between recording the first and second programs when the navigation information for the first and second programs are treated as separately recorded objects.

9. An apparatus for recording video signals, comprising:
    a receiver configured to tune to a channel of broadcast signals and detect a video signal from the channel;
    a recorder configured to record the detected video signal on a recording medium;
    a storage unit configured to store a plurality of scheduled recordings set by a user; and
    a controller coupled to the receiver, the recorder and the storage unit and configured to perform a next scheduled recording without recording navigation information for a first scheduled recording when the next scheduled recording stored in the storage unit is scheduled less than a predetermined reference time after the first scheduled recording is completed, and wherein the navigation information for the first scheduled recording is recorded when the next scheduled recording is completed.

10. The apparatus of claim 9, wherein the controller creates and records navigation information for a consecutive recorded section when said next scheduled recording is completed and there is no further scheduled recording that should be performed consecutively in the storage unit.

11. The apparatus of claim 10, wherein the navigation information manages the consecutive recorded section as a plurality of divided recorded objects where a number of divided recorded objects is the same as the number of scheduled recordings contained in the consecutive recorded section.

12. The apparatus of claim 9, wherein the controller is configured to determine that said next scheduled recording should be performed consecutively when said next scheduled recording partly overlaps with a previous scheduled recording in time or said next scheduled recordings immediately follows the previous scheduled recording in time.

13. The apparatus of claim 9, wherein the controller is configured to control the receiver to tune to a channel on which the first scheduled recording of a plurality of scheduled recordings will be made at a start time of the first scheduled recording, and control the recorder to record a video signal from the tuned channel on the recording medium.

14. The apparatus of claim 9, wherein the apparatus is an optical disc recorder or a DVD-recorder.

15. The apparatus of claim 9, wherein the recording of the first scheduled recording and the next scheduled recording is continuously performed.

\* \* \* \* \*